Oct. 8, 1929.  C. B. OVERLY  1,730,589
STARTING AND GENERATING APPARATUS FOR LIQUID FUEL BURNERS
Filed May 14, 1928  2 Sheets-Sheet 2
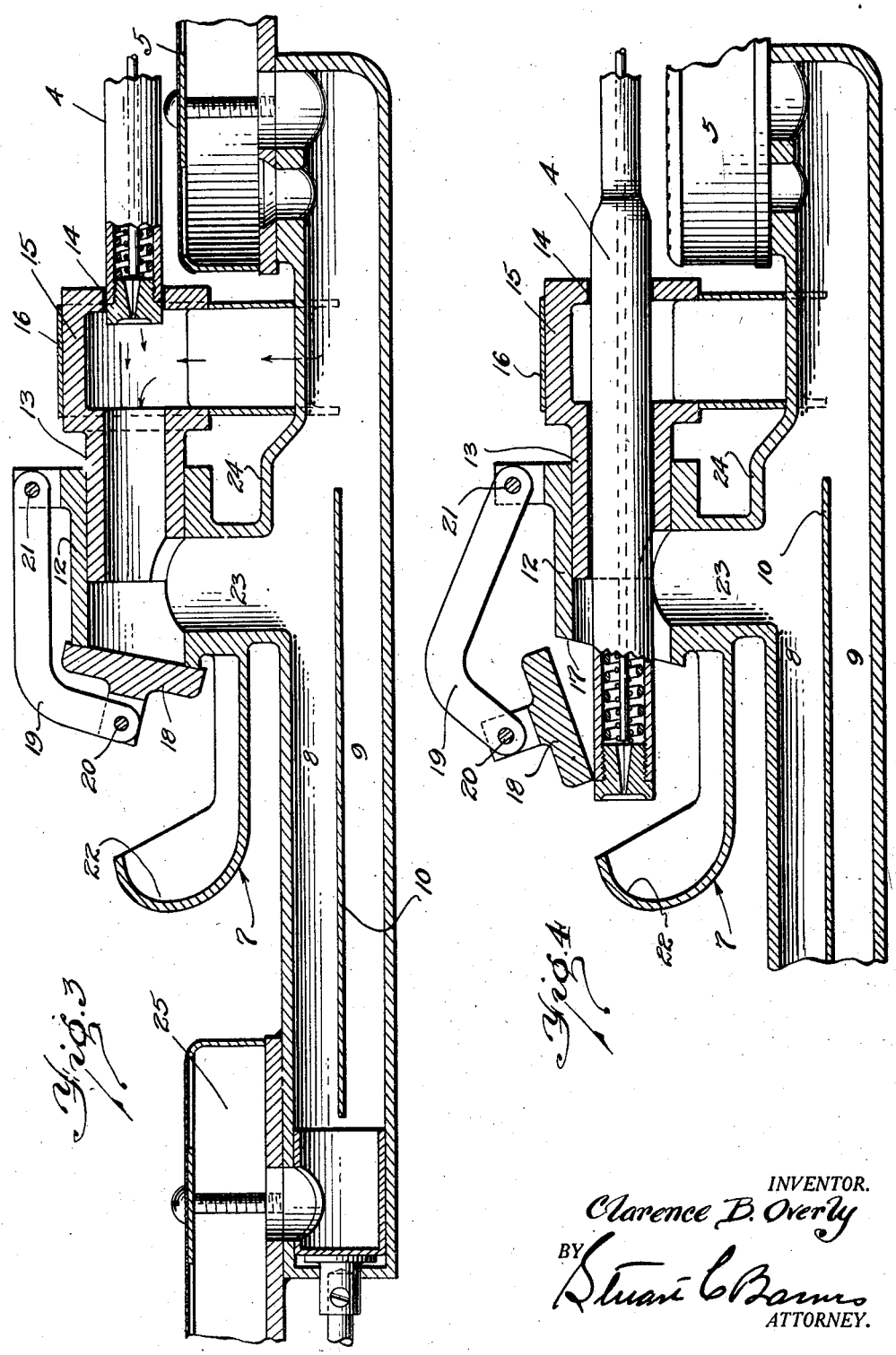
INVENTOR.
Clarence B. Overly
BY
Stuart C. Barnes
ATTORNEY.

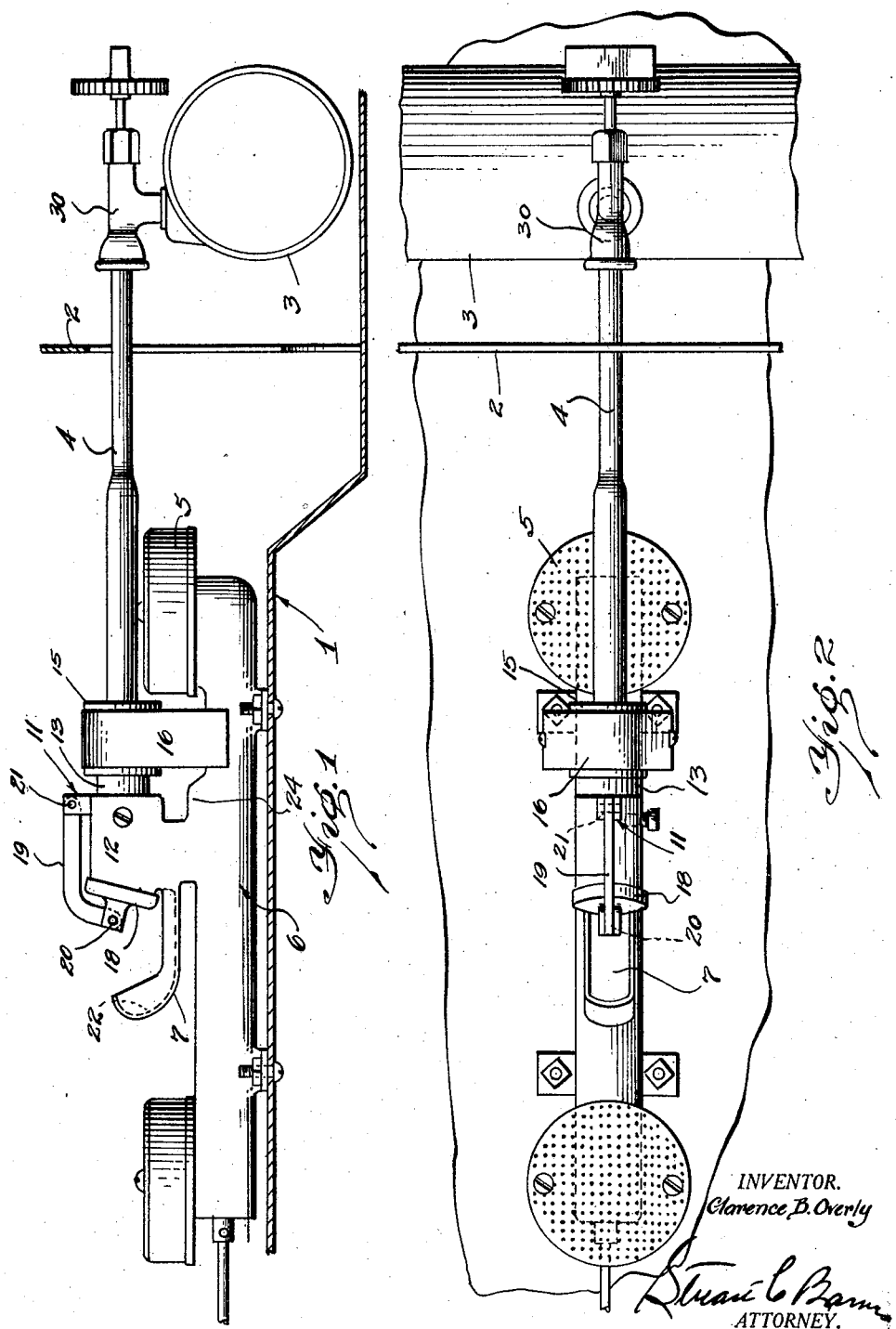

Patented Oct. 8, 1929

1,730,589

UNITED STATES PATENT OFFICE.

CLARENCE B. OVERLY, OF DETROIT, MICHIGAN, ASSIGNOR TO CLAYTON & LAMBERT MANUFACTURING COMPANY, OF DETROIT, MICHIGAN, A CORPORATION OF MICHIGAN

STARTING AND GENERATING APPARATUS FOR LIQUID-FUEL BURNERS

Application filed May 14, 1928. Serial No. 277,492.

This invention relates to starting and generating apparatus for liquid fuel burners. It has to do particularly with novel starting and mixing structure of very compact and efficient design for two burner stoves of the type having a slidable generating unit.

Combined starting and mixing chambers have heretofore been utilized in connection with a slidable generator for effecting starting and continuous carbonization of the liquid fuel. These combined structures have been very satisfactory as to efficiency and commercial operation, but they have presented very serious problems in fabrication and assembly which has made such structures relatively expensive due to the cooperation of the several parts.

It is the object of the present invention to provide an extremely compact and efficient starting and generating mechanism, the parts of which are very simple in design, requiring very little machining and being easily assembled or disassembled.

A further feature of the present invention resides in the provision of a mixing chamber head for receiving the end of a slidable generator tube, a portion of a wall of said mixing chamber housing being movable by the sliding of the generator tube in contact therewith.

A still further feature of the present invention relates to the positioning of a fixed priming cup in direct alignment with the mixing chamber housing and the generator tube, but being positioned beyond the mixing chamber housing whereby the generator tube must pass through the mixing chamber and through a wall thereof before coming into starting position relative to the priming cup. The end of the priming cup is preferably formed into a deflector whereby to deflect the vaporized gases issuing from the generator back against the same to accelerate starting thereof. In this construction, as long as the generator tube remains in starting position the movable portion of the mixing chamber housing will be held in displaced position, but when the generator tube is moved outwardly towards normal operating position this movable portion of the mixing chamber housing will automatically fall into closing position to seal the mixing chamber.

In the drawings:

Fig. 1 is a side elevation of a two burner stove structure embodying my invention, the fuel supply unit and generating tube being shown in normal operating position.

Fig. 2 is a plan view of the structure shown in Fig. 1 and showing the maintained alignment between the generator tube, the burner, the mixing chamber housing, and the priming cup.

Fig. 3 is a longitudinal sectional view of the structure shown in Fig. 1 and illustrating the arrangement and positioning of the various parts when the stove is adapted for normal operation.

Fig. 4 is an enlarged sectional view similar to that shown in Fig. 3 but showing the generator tube in starting position, the movable part of the mixing chamber housing having been displaced by the generator tube.

While I have shown my invention as embodied in a two burner stove structure, it will be understood that the same may be equally well adapted for the starting and continued operation of burners used in various other stove structures and in burner structures other than stove structure.

The formation of the stove casing is immaterial in the present invention and it therefore is shown only in outline, the bottom part thereof being designated as at 1 and a movable end thereof as at 2. The part 2 may be pivoted to permit movement of the fuel tank 3 and the generator tube 4 in and out of the stove casing, although the structure and particular manner of moving the fuel supply unit represented by the tank and generator tube, is immaterial in the present invention as it does not form a part thereof.

The main burner is designated 5 and is permanently positioned within the stove casing as shown in Figs. 1 and 2. This burner 5 may be directly connected with a manifold which is generally designated 6. This manifold 6 may vary widely in design, but in the present embodiment the manifold is shown as being formed integral with the priming cup 7 and a portion of the mixing chamber, and having a main portion formed in two halves 8 and 9 which are divided for a portion of their length by means of a suitable partition or baffle 10, the purpose of which will be later described.

The mixing chamber, which may be generally designated 11, is formed of a cylindrical portion 12 which is adapted to adjustably receive a second cylindrical portion 13. The portion 13 of the mixing chamber housing is provided with an aperture as at 14 for receiving the jet block or end of the generator tube 4, and to guide the same to and from starting position. The bottom part of the head 15 of this cylindrical member 13 is preferably cut away, and a channeled V-shaped sheet metal housing 16 is preferably positioned around the entrance head 15 of the air chamber whereby the channel portions thereof extend downwardly and outwardly, and terminate at points adjacent the outer edges of the manifold, as clearly shown in the drawings. This sheet metal member 16 provides necessary passageways for conducting air to the mixing chamber 13 at which point it combines with the vaporized gases from the generator tube to form a combustible mixture which may be conducted towards the burners.

One end of the cylindrical member 12 is provided with a valve face 17 which is preferably formed or machined at an angle to the axis of the cylinder 12. A valve member 18 is connected to the cylindrical housing 12 by means of the lever 19 which is pivoted to the valve and cylindrical member 12 as at 20 and 21. The lever 19 and the pivots are so arranged that the valve member 18 contacts with the angular valve face 17 when in normal position, as shown in Fig. 3.

The priming cup 7 is so positioned, in alignment with the generator tube, burner, and mixing chamber, that the generator tube 4 when moved to its innermost position has its enlarged end portion positioned directly above the priming cup, as shown in Fig. 4. The end of the priming cup is provided with a curved deflecting surface 22 whereby the vaporized gases issuing from the generator will impinge against said curved surface and will be deflected downwardly and then backwardly against the generator tube itself to accelerate starting thereof.

By moving the generator tube from the position shown in Fig. 3 to the starting position shown in Fig. 4, such tube will be guided by the member 13 and will contact with the valve 18 to raise and hold the same in raised position, as shown in Fig. 4, until after the starting operation. When the generating tube is returned towards its normal operating position, the valve member 18 will automatically return to its normal position to close and seal the cylindrical member 12 of the mixing chamber. The supply unit, comprising the tank 3 and generator tube 4, therefore preferably has two positions of operation, one, that shown in Fig. 3 where the jet block of the generator tube is positioned adjacent the entrance head of the mixing chamber, and two, that shown in Fig. 4 where the generating tube is moved to a position adjacent the deflecting surface of the priming cup.

The partition 10 of the manifold 6 preferably terminates adjacent the downwardly extending manifold 23, as clearly shown in Figs. 3 and 4, and the portion 24 of the main manifold 6 is preferably enlarged adjacent the terminus of the baffle 10 whereby the cross sectional area of the passageway towards the main burner 5 will be equal or correctly proportioned to the cross sectional area of the passageways 8 and 9 which lead to and from the auxiliary burner 25. The opposite end of the baffle 10 terminates adjacent the valve for the burner 25 and it will thus be obvious that as long as any vaporized gases are ejected from the generator tube, during normal operation of the stove, some of such gases will be conducted continuously towards the auxiliary burner 25. If the burner valve is open, the gases of course will be conducted to the burner and ignited. If the valve is closed the gases will be conducted in a circuitous path whereby the gases present in the manifold will always be at a proper mix for correct combustion.

In normal position the fuel supply unit is preferably located within the stove casing which would be the position illustrated in part in Fig. 4. In operation, in order to start the stove, the generator tube is left in the position shown in Fig. 4, or moved to such position, whereby the valve plate 18 is in raised position and the jet block of the generator tube is positioned adjacent the deflector member of the priming cup.

A small amount of gasoline is ejected from the generator tube by opening and closing the valve 30. This gasoline is then ignited and the open flame therefrom soon heats the enlarged end of the generator tube, which is preferably provided with capillary coils as shown, whereby the gasoline in the end of the tube is quickly vaporized and ejected from the jet block under pressure. This vaporized gas is directed against the deflector 22 and redirected downwardly and backwardly over the surface of the gasoline in the cup and against the generator tube whereby a positive blast of flame will strike the generating tube to very materially accelerate starting thereof. When the gasoline in the priming cup has burned out, or even before such burning out, the generator tube may be moved towards its normal operating position, as shown in Fig. 3, whereby the valve closure 18 will automatically drop of its own weight, to closed position. When the end of the generator tube is moved to its position as shown in Fig. 3, the stove is ready for operation and the further opening of the valve 30 will cause the vaporized gases to pass into the mixing chamber where they will combine with the incoming air and form a combustible gas which will be conducted downwardly through the manifold conduit 24 and into the main burner 5 where such gases will be ignited to heat the enlarged portion of the generating tube to maintain continuous generation.

What I claim is:

1. Starting and mixing structure for liquid fuel burners, comprising a housing forming a mixing chamber, a priming cup positioned adjacent one side of the housing and a burner positioned adjacent the opposite side of said housing, and a generating tube positioned above said burner and slidable through the housing to a position above the priming cup.

2. Starting, mixing, and generating apparatus for liquid fuel burners, comprising a fixed priming cup, mixing chamber and burner positioned in alignment in the order named, and a generating tube positioned in alignment with said starting, mixing, and generating members and adapted to be moved from a position above the burner to a position above the priming cup.

3. Starting structure for liquid fuel burners of the type having a mixing chamber housing, comprising a priming cup fixably positioned relative to the housing, a portion of the housing being movable, and a generating tube slidable through the housing and the opening formed by said movable portion to a position above the priming cup.

4. Starting and mixing structure for liquid fuel burners, comprising a mixing chamber housing and a priming cup fixably positioned adjacent the housing, a closure for said mixing chamber housing and a generator tube slidable through said housing and against said closure to open the same.

5. Starting and mixing structure for liquid fuel burners, comprising a mixing chamber housing having a pivoted closure member therefor, a priming cup fixably positioned adjacent said housing and said closure member, and a generating tube slidable through said housing to a position above the priming cup, said tube contacting with and displacing the pivoted closure when moved through the housing.

6. Starting and mixing structure for liquid fuel burners, comprising a slidable generator tube, a mixing chamber housing in longitudinal alignment therewith, and having an opening for receiving and guiding said generator tube, and a fixed priming cup in alignment with said generating tube and mixing chamber housing and having a blast deflecting surface in axial alignment with said generating tube, whereby the gases from the generating tube, when positioned above the priming cup, will strike said surface and be directed rearwardly against the tube.

7. Starting and mixing structure for liquid fuel burners, comprising a slidable generator tube, a mixing chamber housing in longitudinal alignment therewith and having an opening for receiving and guiding said generator tube, a fixed priming cup in alignment with said generating tube and mixing chamber housing and having a blast deflecting surface in axial alignment with said generating tube, whereby the gases from the generating tube when positioned above the priming cup, will strike said surface and be directed rearwardly against the tube, a portion of the mixing chamber housing being in alignment with the generator tube and the blast deflector portion of the priming cup, and being movable to permit movement of the generating tube through the mixing chamber housing.

8. A two burner stove construction, comprising in combination a manifold connecting two burners and a mixing chamber housing connected to the manifold and positioned in alignment with the burners, an inlet head forming a part of the mixing chamber housing for receiving and guiding a slidable generator tube, a movable valve member forming a part of the mixing chamber housing and positioned in axial alignment with the generator tube, a priming cup fixably positioned relative to the mixing chamber housing and also in alignment with the generator tube and with the two burners, the generator tube being slidable through the mixing chamber housing to a position above the priming cup for starting and being retractable to a position above one of the burners for normal operation.

9. A two burner stove construction, comprising in combination a manifold connecting the burners, and a mixing chamber housing connected to the manifold and positioned in alignment with the burners, an inlet head forming a part of the mixing chamber housing for receiving and guiding a slidable generator tube, a movable valve member forming a part of the mixing chamber housing and positioned in axial alignment with the generator tube, a priming cup fixably positioned relative to the mixing chamber housing and also in alignment with the generator tube and with the two burners, the generator tube being slidable through the mixing chamber housing to a position above the priming cup for starting and being retractable to a position above one of the burners for continued operation, the said movable valve member being adapted to automatically return to sealing position against the housing when said generating tube is moved to retracted operating position.

10. Starting and mixing structure for liquid fuel burners, comprising a mixing chamber having a pivotal closure member and an entrance head, a slidable generating tube movable through and guided by an aperture in said entrance head, and a priming cup having a blast deflector, said closure member, entrance head, aperture and blast deflector being positioned in axial alignment.

11. Starting and mixing structure for liquid fuel burners, comprising a mixing chamber having a pivotal closure member and an entrance head, a slidable generating tube movable through and guided by an aperture in said entrance head, and a priming cup having a blast deflector, said closure member, entrance head, aperture, and blast deflector being positioned in axial alignment, and said generating tube being slidable through said mixing chamber housing to contact with and displace said pivoted closure member and movable to a position above said priming cup and in front of said blast deflector.

12. Starting and mixing structure for liquid fuel burners, comprising a housing forming a mixing chamber, a priming cup positioned adjacent one side of the housing and a burner positioned adjacent the opposite side of said housing, and a generating tube positioned adjacent said burners to be heated thereby, said generating tube and mixing chamber housing being relatively movable whereby said tube will pass through the housing to a position above the priming cup.

13. Starting structure for liquid fuel burners, comprising a mixing chamber housing, a priming cup fixably positioned relative to the housing, a generating tube positioned in alignment with said housing and priming cup, said housing having a movable portion in alignment with said generating tube and priming cup, and said housing and generating tube being relatively movable whereby said generating tube passes through said housing against said movable portion and to a position above said priming cup.

In testimony whereof I affix my signature.

CLARENCE B. OVERLY.